United States Patent [19]
Grover et al.

[11] Patent Number: 5,522,261
[45] Date of Patent: Jun. 4, 1996

[54] FLUID FLOW DIRECTION AND VELOCITY MONITOR AND TEMPERATURE COMPENSATING CIRCUIT THEREFOR

[75] Inventors: Stephen F. Grover, Libertyville; Scott A. Ullrich, Des Plaines; Edward Montividas, Hanover Park; Frederico Chu, Glenview, all of Ill.

[73] Assignee: Alnor Instrument Company, Skokie, Ill.

[21] Appl. No.: 342,350

[22] Filed: Nov. 18, 1994

[51] Int. Cl.$^6$ ............................................. G01F 1/68
[52] U.S. Cl. ............................. 73/204.18; 73/204.19
[58] Field of Search ............................. 73/204.18, 204.19

[56] References Cited

U.S. PATENT DOCUMENTS

| | | | |
|---|---|---|---|
| 3,891,391 | 6/1975 | Boone | 73/204.18 |
| 4,319,483 | 3/1982 | Durham, Jr. et al. | 73/204.18 |
| 4,733,559 | 3/1988 | Aine et al. | 73/195 |
| 4,787,251 | 11/1988 | Kolodjski | 73/755 |
| 4,982,605 | 1/1991 | Oram et al. | 73/204.19 |
| 5,072,614 | 12/1991 | Hisanaga | 73/204.19 |

*Primary Examiner*—Richard Chilcot
*Assistant Examiner*—Jewel V. Artis
*Attorney, Agent, or Firm*—Skadden, Arps, Slate, Meagher & Flom

[57] ABSTRACT

A fluid flow direction and velocity monitor, particularly useful in monitoring pressure differentials between a controlled environment and its surroundings, includes a heated thermal sensor situated between upstream and downstream cold thermal sensors within a channel. The heated thermal sensor provides a pressure differential or fluid flow velocity signal. The pair of cold thermal sensors are utilized to provide both temperature compensation and fluid flow direction. The pressure differential and direction signals are combined by the circuitry to yield a single digital direction and pressure signal.

8 Claims, 3 Drawing Sheets

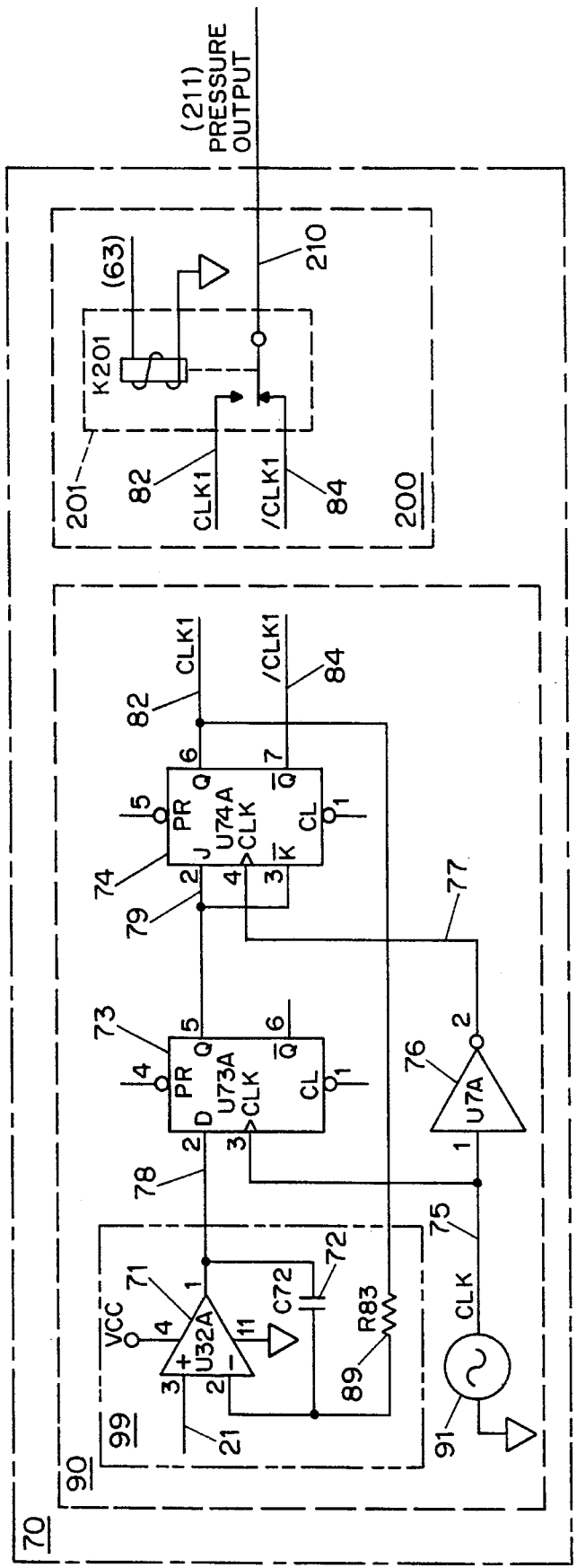
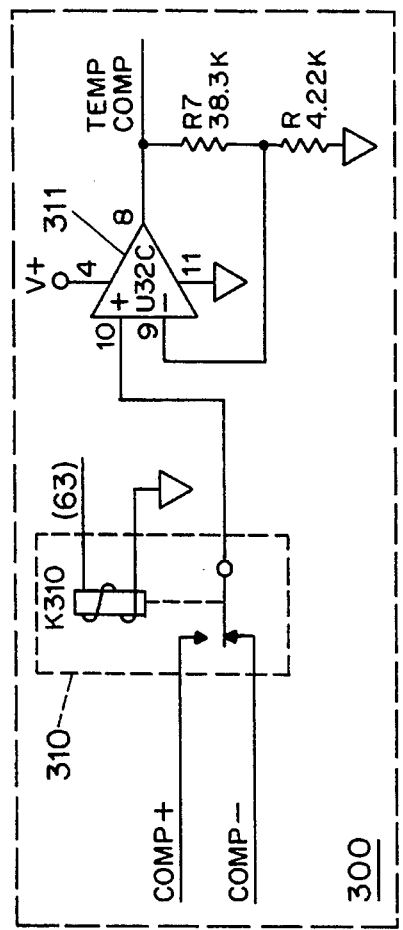
FIG. 3
FIG. 4

FLUID FLOW DIRECTION AND VELOCITY MONITOR AND TEMPERATURE COMPENSATING CIRCUIT THEREFOR

FIELD OF THE INVENTION

This invention relates generally to fluid flow direction and velocity monitors, and more specifically to a ventilation related monitor for detecting the direction and velocity of gas flow in a tube or channel connecting two rooms.

BACKGROUND OF THE PRESENT INVENTION

A number of flow measurement and detection arrangements have been developed over the years. These devices may be generally categorized as one-, two- and three-element devices. Single sensor devices can calculate fluid velocity, but are generally not suitable for determining fluid flow direction.

Two- and three-element devices generally operate on the principle of adding heat to a flowing fluid and measuring the heat transfer functions of sensors placed along the fluid flow stream. The difference between the heat transfer functions of the upstream and downstream sensors is used to calculate flow direction and velocity.

For example, U.S. Pat. No. 4,787,251 reports a two-element configuration. The configuration in U.S. Pat. No. 4,787,251 requires that both sensors produce a significant thermal wake. To produce these thermal wakes, both sensors are typically 30°–100° C. above that of the surrounding fluid temperature. The thermal wake is sensed by the downstream sensor. Use of both sensors as heating elements results in unnecessary power loss, in that the heat added by the downstream element is not utilized.

U.S. Pat. No. 4,982,605 describes a two-element configuration for detecting fluid flow velocity in a fume hood. This two-element configuration is utilized to detect fluid flow velocity and provides for temperature compensation due to changes in the ambient fluid flow temperature. This configuration, however, can not detect fluid flow direction which is critical in many applications.

Thus, there exists a need for an inexpensive and reliable fluid flow direction and velocity monitor, including a temperature compensation means, for use in laboratories, hospitals and other ventilation applications where airborne contaminants must be isolated within or outside of a controlled space. Reliable fluid flow direction monitors may be used to maintain minimal pressure differentials between the controlled and non-controlled spaces. Reliable detection of minimal pressure differentials allows for the use of lower volume air supply systems, therefore, reducing energy requirements.

SUMMARY OF THE INVENTION

To detect fluid flow direction and velocity within a fluid flow channel, a heated thermal sensor is situated between two cold (i.e. non-heated) thermal sensors within the fluid flow tube. Heat transfer from the heated thermal sensor is modeled utilizing the well known King's Law to provide fluid flow velocity. The thermal sensors are situated such that only one of the cold thermal sensors will be downstream from the central heated thermal sensor when fluid flow is present. The cold thermal sensor downstream from the central heated thermal sensor will thus be exposed to greater heat than the upstream cold thermal sensor. This exposure heats the downstream cold thermal sensor and increases or decreases its electrical resistance depending upon the type of thermal sensor used. The difference between the electrical resistance of the upstream and downstream cold thermal sensor is monitored and used to determine fluid flow direction. The two cold thermal sensors are also used to provide temperature compensation to the central heated thermal sensor which is critical for allowing the single heated thermal sensor to provide fluid flow velocity across varying ambient fluid temperatures.

It is an object of the invention to provide a simple, fluid flow direction and velocity monitor.

It is another object of this invention to provide a fluid flow direction and velocity monitor for determining the direction and velocity of fluid flow utilizing a single heated thermal sensor and two cold thermal sensors, wherein the heated thermal sensor is located between the two cold thermal sensors such that the downstream cold thermal sensor will be heated to a higher temperature than the upstream cold thermal sensor.

It is another object of this invention to provide a fluid flow direction and velocity monitor utilizing a single heated thermal sensor and two cold thermal sensors located in a channel connecting two rooms or spaces. The fluid flow direction and velocity monitor is used to verify that one of the rooms or spaces is maintained at a higher pressure than the other space. Such pressure differentials are critical in hospital operating rooms, isolation rooms, and clean room environments.

It is another object of this invention to provide a single coded digital signal indicating both the magnitude and direction of the pressure differential between the two connected rooms or spaces.

BRIEF DESCRIPTION OF THE DRAWINGS

For a more complete understanding of the present invention, reference is made to the following Detailed Description taken in conjunction with the accompanying drawings in which:

FIG. 3 is an electrical schematic diagram of an analog to digital converter constructed in accordance with the present invention for creating a digital directional and velocity signal related to fluid flow direction and velocity; and FIG. 4 shows an alternate combination circuit constructed in accordance with the present invention.

DETAILED DESCRIPTION

Preferred embodiments of the present invention will now be described with reference to the drawings.

Figure 1:
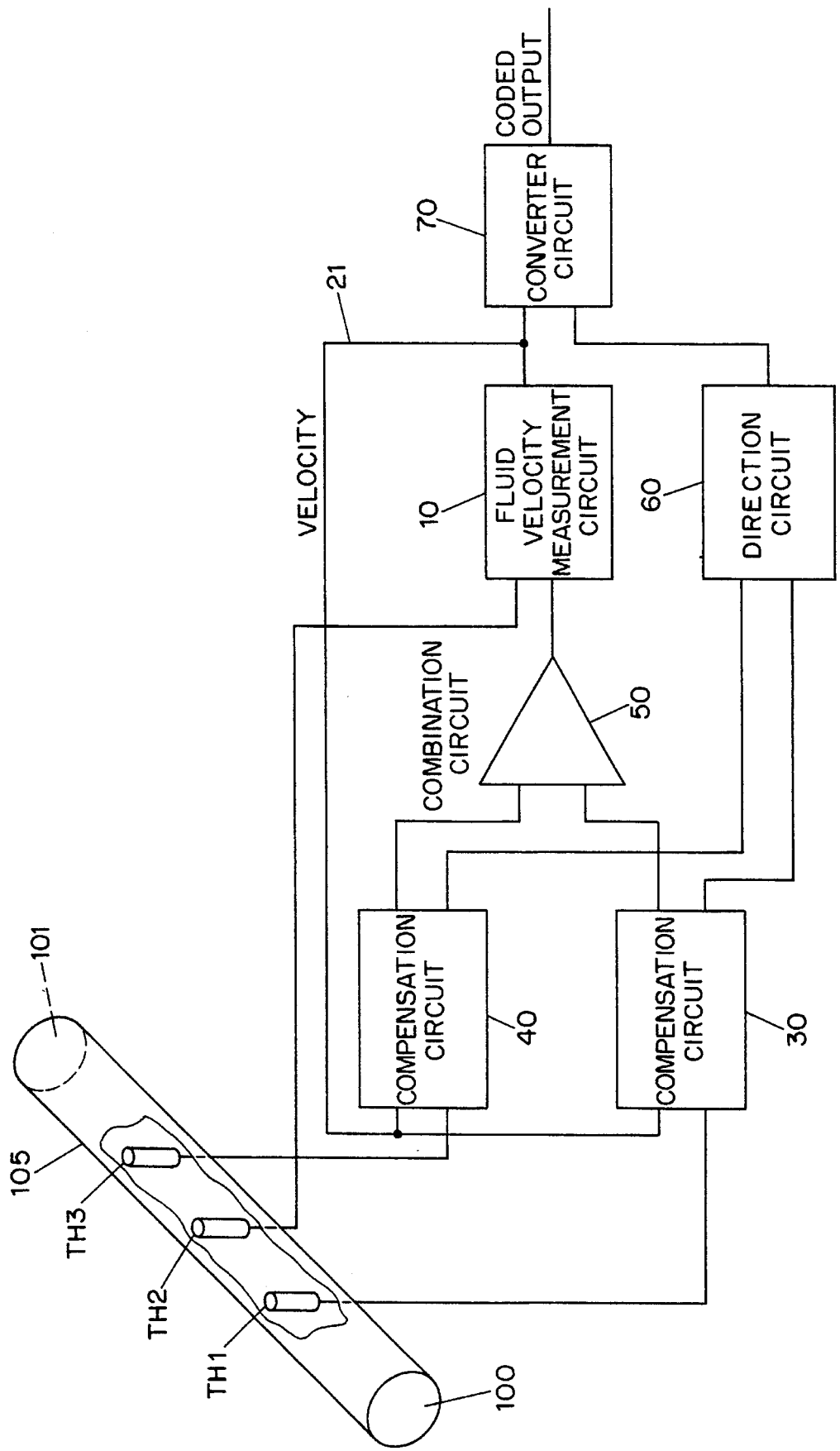
FIG. 1 is a perspective view, with a cutaway portion, showing a fluid flow direction and velocity monitor including the placement of the heated thermal sensor and two cold thermal sensors according to the principles of the present invention.

Referring to FIG. 1, the fluid flow direction and velocity monitor includes a fluid flow channel 105 having a first opening 100 and second opening 101. A first cold thermistor TH1 and a second cold thermistor TH3 are disposed within the fluid flow tube 105. A heated thermistor TH2 is disposed between the cold thermistors TH1 and TH3, and heated above ambient temperature. Fluid flowing over the heated thermistor TH2 will be heated and will flow over one of the cold thermistors: either TH1 or TH3, depending upon which cold thermistor is downstream from heated thermistor TH2, and heat the downstream thermistor. The heated thermistor TH2 preferably is heated to an operating temperature on the order of 70° C. above ambient.

In typical applications such as hospital operating rooms, isolation rooms, and clean room environments, the fluid flow tube 105 connects two rooms or spaces. The monitor is thus used to verify and measure the fluid flow direction and velocity. The pressure differential is a function of the velocity of the fluid flow and the area of the fluid flow tube 105, and may be calculated using well known techniques.

Figure 2:
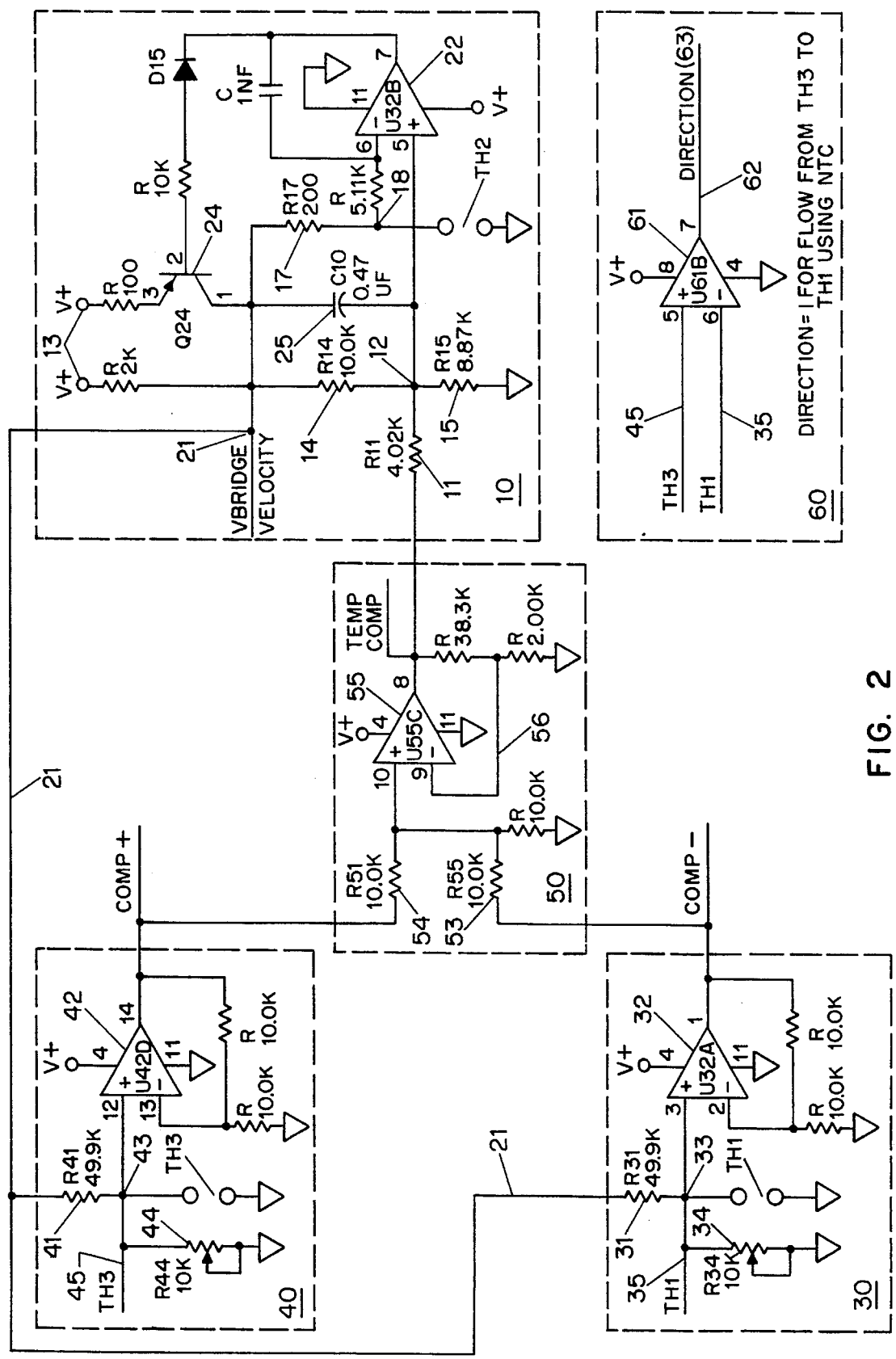
FIG. 2 is an electrical schematic diagram of a monitor constructed in accordance with the present invention.

FIG. 2 illustrates a fluid velocity measurement circuit 10, compensation circuits 30 and 40, combination circuit 50, and direction circuit 60 constructed in accordance with the principles of the present invention.

The first compensation circuit 30 and the second compensation circuit 40, include a first cold thermistor TH1 and a second cold thermistor TH3 respectively. Current through the cold thermistors TH1 and TH3 is limited to avoid self-heating of the cold thermistors TH1 and TH3. The first compensation circuit 30 and second compensation circuit 40 are each coupled to the velocity voltage on lead 21 by resistors 31 and 41 respectively. The output at node 33 of the first cold thermistor TH1 is coupled through an amplifier 32 and a resistor 53 to an amplifier 55 forming the combination circuit 50. The output node 43 of the second cold thermistor TH3 is similarly coupled through an amplifier 42 and a resistor 54 to the amplifier 55 of the combination circuit 50. The output of amplifier 55 is coupled through a resistor 11 to one node 12 of a bridge circuit forming the fluid velocity measurement circuit 10.

Nodes 33 and 43 are also coupled to ground by variable resistors 34 and 44 respectively. Resistors 34 are 44 are shown as variable resistors but can be replaced by fixed value resistors for production runs and are typically on the order of 3 k. Nodes 33 and 43 are further coupled via leads 35 and 45 respectively, to an amplifier 61 which forms the direction circuit 60.

One of the two cold thermistors TH1 or TH3 will be downstream from the heated thermistor TH2 and therefore hotter than the ambient fluid flow temperature. If the fluid flow direction is such that fluid passes the first cold thermistor TH1, then the heated thermistor TH2, and then the second cold thermistor TH3, the first cold thermistor TH1 will be cooler than the second cold thermistor TH3, If the cold thermistors TH1 and TH3 have a negative temperature coefficient, the voltage at node 33 will be lower than that at node 43 and the direction voltage 63 on lead 62 of the direction circuit 60 will be low (i.e. negative). If, on the other hand, fluid is flowing in the reverse direction such that fluid flows past the second cold thermistor TH3 before being heated by TH2 and then warming the first cold thermistor TH1, the direction voltage 63 on lead 62 will be high (i.e. positive).

The combination circuit 50 consists of an amplifier 55 and feedback loop 56 which amplify the voltages from amplifiers 32 and 42 to provide compensation to the measurement circuit 10. The combination circuit is constructed to average the two voltages from amplifiers 32 and 42, thus averaging the effect of the heated thermistor TH2 on the ambient temperature.

FIG. 4 shows an alternate combination circuit 300 which, rather than perform an averaging function, selects the voltage from the upstream thermistor. Switch 310 receives the direction voltage 63 on lead 62. When the direction voltage 63 is logic low, switch 310 selects the voltage from amplifier 32 (COMP−). When the direction voltage 63 is logic high, the voltage from amplifier 42 (COMP+) is selected. Amplifier 311 amplifies the selected voltage and provides compensation to the measurement circuit 10.

The fluid velocity measurement bridge circuit node 12 of FIG. 3 is coupled to a supply voltage 13 by a resistor 14 and to ground by a resistor 15. The supply voltage is typically on the order of 20 volts. A second node 18 of the bridge circuit is coupled to the supply voltage 13 by a resistor 17 and to ground by the heated thermistor TH2.

The difference of the voltages on the nodes 12 and 18 is maintained at zero because as fluid flow across the heated thermistor TH2 changes, the resistance of the heated thermistor $R_H$ changes and the output on lead 21 is automatically changed by an amplifier circuit 22 coupled to the nodes 12 and 18 and to a transistor 24. The output or velocity voltage on lead 21 is a proper measure of the true fluid velocity as long as the ambient fluid temperature does not change.

The fluid velocity measurement bridge circuit includes capacitor 25 to quickly heat the heated thermistor TH2 during start up conditions.

When the ambient temperature changes, the combination circuit adds or subtracts current from node 12 to offset the temperature change. This change effectively maintains the ratio of $R_c/R_H$ approximately constant, as required by the well known King's Law, where $R_c$ is the resistance of an unheated element and $R_H$ is the resistance of a heated element. If the ratio of $R_c/R_H$ is not held constant then, even though the actual velocity has not changed, the indicated velocity will change as temperature changes, because $R_c$ will vary with changes in ambient temperature. Amplifiers 32 and 42 of the first compensation circuit 30 and the second compensation circuit 40 respectively, also see a feedback via from the fluid velocity measurement circuit 10 the resistors 31 and 41 respectively. The velocity feedback current to the amplifiers 32 and 42 negates the velocity component and hence the current added or subtracted to node 12 is only the direct current value due to the temperature changes sensed by the cold thermistors TH1 and TH3. This velocity feedback current to amplifiers 32 and 42 is important for stabilizing the circuit.

FIG. 3 illustrates a converter circuit 70 for converting the analog velocity and directional voltages into a single coded digital directional and velocity signal. The converter circuit 70 includes integrating circuit 99 consisting of amplifier 71, capacitor 72 and resistor 89. Integrating circuit 99 is fed the velocity voltage produced by fluid velocity measurement circuit 10 via lead 21 and performs an integrating function on the input velocity voltage. Capacitor 72 and resistor 89 create the time function over which the integration is performed. Integrating circuit 99 feeds its output into data latch 73 which stores the signal at the input terminal 78 during the previous interval in which the clock input 75 was ill a high state. The data latch output is fed into input 79 of the $\overline{JK}$ master-slave flip-flop 74. The clock input (CLK) 75 is input to inverter 76 to produce a phase-shifted clock signal (/CLK). /CLK is used to clock the $\overline{JK}$ master-slave flip-flop 74. The $\overline{JK}$ flip-flop 74 outputs a frequency signal (CLK1) on its Q output, lead 82, wherein the frequency of pulses of signal CLK1 is related to the velocity voltage. The $\overline{JK}$ flip-flop 74 also outputs a phase-shifted version of the frequency signal (/CLK1) on the $\overline{Q}$ output on lead 84. Increases in the pressure differential across the first opening 100 and the second opening 101 of the fluid flow tube 105 cause fluid velocity to increase. This in turn increases the velocity voltage which causes the frequency of pulses of CLK1 to increase.

The frequency signal CLK1 and phase-shifted frequency signal /CLK1 on leads 82 and 84 respectively, and the direction voltage 63 on lead 62 are input to selector 200 of converter circuit 70. Selector 200 includes switch 201 which receives direction voltage 63 on lead 62. Switch 201 selects /CLK1 when direction voltage 63 is logic low. When direction voltage 63 is high, switch 201 selects CLK. The logic table for the selector 200 is given by the equation:

$$\text{OUTPUT} = \text{DIR} \cdot \text{CLK} \cdot /\text{CLK1} + \overline{\text{DIR}} \cdot \text{CLK1} \cdot /\text{CLK1} + \text{DIR} \cdot \overline{\text{CLK}}\\ \overline{1} \cdot \text{CLK1} + \text{DIR} \cdot \text{CLK1} \cdot /\text{CLK1}$$

where DIR=1 when the directional voltage 63 on lead 62 is logical high, and DIR=0 when the directional voltage 63 is logical low.

The coded output 211 produced by selector 200 on lead 210 is, therefore, given by the equation:

$$\text{CODED OUTPUT} = CLK1 \text{ when } DIR = 1\\ /CLK1 \text{ when } DIR = 0$$

It is understood that various other modifications will be apparent to and can be readily made by those skilled in the art without departing from the scope and spirit of the present invention. Accordingly, it is not intended that the scope of the claims be limited to the description set forth herein, but rather that the claims be construed as encompassing all features of patentable novelty that reside in the present invention, including all features that would be treated as equivalents by those skilled in the art.

What is claimed is:

1. A fluid flow direction and velocity monitor having a fluid flow channel with a first opening and a second opening, said fluid flow direction monitor comprising:

a first thermal sensor disposed within said fluid flow channel;

a second thermal sensor disposed within said fluid flow channel, said second thermal sensor distal to said first opening relative to said first thermal sensor;

a third thermal sensor disposed between said first and second thermal sensor in said fluid flow channel, said thermal sensors each having an electrical resistance that is a function of temperature;

means for heating said third thermal sensor;

velocity sensing means coupled to said third thermal sensor for monitoring the resistance changes in said heated thermal sensor and producing a velocity voltage signal related to the fluid flow velocity within said fluid flow channel;

a first temperature compensation means coupled to said first thermal sensor for producing a first compensation voltage related to the resistance changes in said first thermal sensor;

a second temperature compensation means coupled to said second thermal sensor for producing a second compensation voltage related to the resistance changes in said second thermal sensor;

a combination means for combining said first compensation voltage and said second compensation voltage to produce a combined compensation voltage;

means for compensating for changes in ambient temperature by applying said combined compensation voltage to said velocity sensing means to modify current flow in relation to said resistance changes in said first thermal sensor and said second thermal sensor; and a direction circuit means electrically connected to said first thermal sensor and said second thermal sensor for determining whether said first thermal sensor or said second thermal sensor is downstream of said heater means and producing a directional voltage signal.

2. The fluid flow direction and velocity monitor of claim 1 wherein said combination circuit means consists of an amplifier and a feedback loop whereby said combination circuit averages said first compensation voltage and said second compensation voltage to produce a combined compensation voltage related to the averaged temperature sensed by said first thermal sensor and said second thermal sensor.

3. The fluid flow direction and velocity monitor of claim 1 wherein said combination circuit means consists of an amplifier and a switch electrically coupled to said direction circuit for selecting said first compensation voltage or said second compensation voltage in relation to said directional voltage signal.

4. The fluid flow direction and velocity monitor of claim 3 wherein said direction circuit means consists of an operational amplifier, said operational amplifier producing a directional voltage signal, said directional voltage signal being logic low when fluid is flowing in one direction and logic high when fluid is flowing in the other direction.

5. The fluid flow direction and velocity monitor of claim 4 wherein said first thermal sensor, said second thermal sensor, and said third thermal sensor are thermistors.

6. The fluid flow direction and velocity monitor of claim 5 further comprising a converter circuit electrically coupled to said direction circuit means and said velocity sensing means for converting said directional voltage signal and said velocity voltage signal to a coded digital velocity and directional signal.

7. The fluid flow direction and velocity monitor of claim 6 wherein said converter circuit comprises:

a clock generation means for supplying a clock input signal;

a clock inverter means electrically coupled to said clock input generation for producing an inverted clock input signal;

an integrating circuit means electrically coupled to said directional circuit for integrating the velocity voltage signal as a function of time;

a data latch means electrically coupled to said integrating circuit and said clock input generation for latching the input received from said integrating circuit;

a master-slave flip-flop electrically coupled to said data latch means and said clock inverter input means whereby said master-slave flip-flop outputs a frequency signal related to said velocity voltage signal on a first lead and a phase-shifted version of said frequency signal on a second lead; and a selector circuit electrically coupled to said master-slave flip-flop and said directional circuit for selecting as a function of said directional voltage signal either said frequency signal or said phase-shifted frequency signal.

8. A fluid flow pressure monitor having a fluid flow channel with a first opening and a second opening, said fluid flow direction monitor comprising:

a first thermal sensor disposed within said fluid flow channel;

a second thermal sensor disposed within said fluid flow channel, said second thermal sensor distal to said first opening relative to said first thermal sensor;

a third thermal sensor disposed between said first and second thermal sensor in said fluid flow channel, said thermal sensors each having an electrical resistance that is a function of temperature;

means for heating said third thermal sensor;

pressure sensing means coupled to said third thermal sensor for monitoring the resistance changes in said heated thermal sensor and producing a pressure voltage signal related to the fluid flow velocity within said fluid flow channel;

a first temperature compensation means coupled to said first thermal sensor for producing a first compensation voltage related to the resistance changes in said first thermal sensor;

a second temperature compensation means coupled to said second thermal sensor for producing a second compensation voltage related to the resistance changes in said second thermal sensor;

a combination means for combining said first compensation voltage and said second compensation voltage to produce a combined compensation voltage;

means for compensating for changes in ambient temperature by applying said combined compensation voltage to said pressure sensing means to modify current flow in relation to said resistance changes in said first thermal sensor and said second thermal sensor; and a direction circuit means electrically connected to said first thermal sensor and said second thermal sensor for determining whether said first thermal sensor or said second thermal sensor is downstream of said heater means and producing a directional voltage signal.

* * * * *